June 9, 1953   H. J. MURPHY   2,641,472
RACING GAME DEVICE

Filed April 29, 1949   3 Sheets-Sheet 1

INVENTOR.
HOWARD J. MURPHY,
BY John Todd
ATTORNEY.

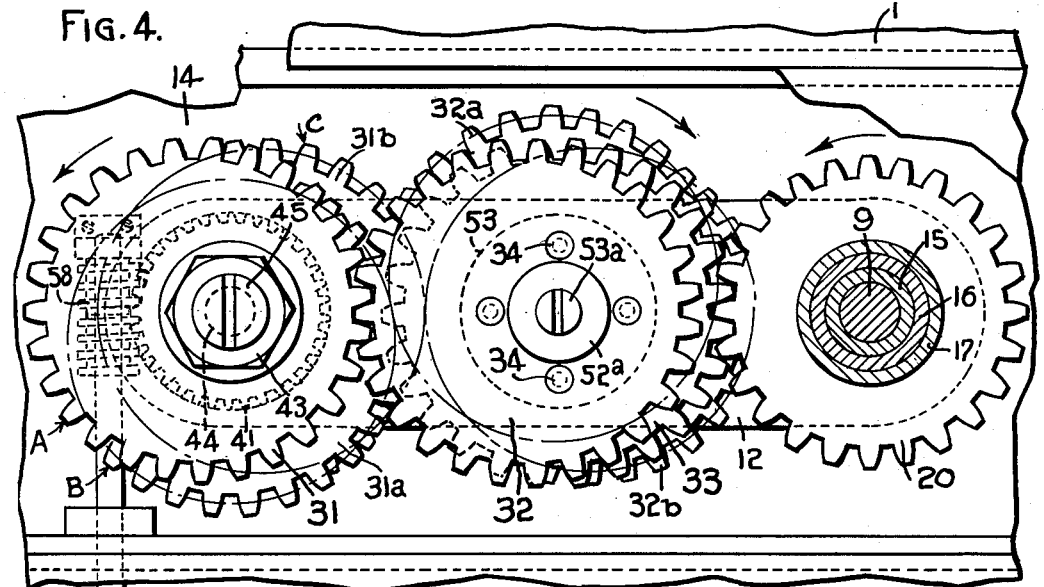
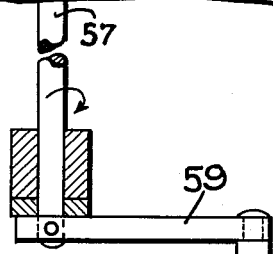
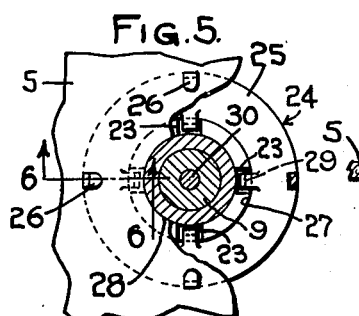
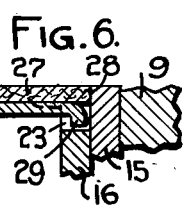
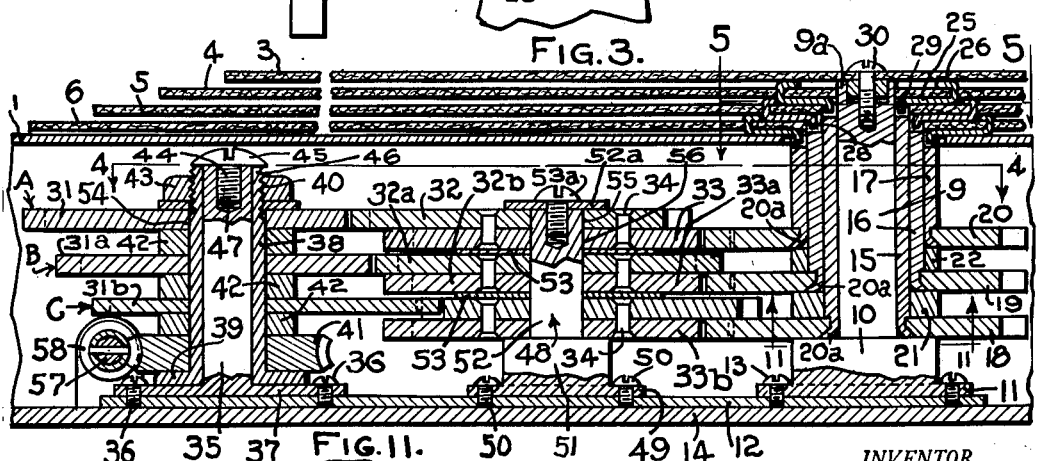

June 9, 1953  H. J. MURPHY  2,641,472
RACING GAME DEVICE
Filed April 29, 1949  3 Sheets-Sheet 3

INVENTOR.
HOWARD J. MURPHY
BY John Todd
ATTORNEY.

Patented June 9, 1953

2,641,472

UNITED STATES PATENT OFFICE 2,641,472

RACING GAME DEVICE

Howard J. Murphy, Lynnfield, Mass.

Application April 29, 1949, Serial No. 90,520

2 Claims. (Cl. 273—86)

This invention relates to an amusement device adapted to operate in a way to simulate a race on a track.

It is one object to provide a series of superposed discs each of which carries an object representing a horse, automobile or the like, the discs being arranged to rotate freely one relative to another and to move at varying speeds relative to each other.

Another object is the provision of a series of gear trains each of which is of simple, inexpensive construction, the trains being constructed and arranged to drive the discs at varying speeds.

Other objects and uses of my invention will be apparent from inspection of the drawing and specification hereinbelow set forth.

Referring to the drawings in which I have disclosed a preferred embodiment of my invention:

Fig. 3 is an enlarged section taken on the line 3—3 of Fig. 1;

Fig. 4 is a section taken on the line 4—4 of Fig. 3;

Fig. 5 is a fragmentary sectional view taken on the line 5—5 of Fig. 3;

Fig. 6 is a section taken on the line 6—6 of Fig. 5;

Figure 1:
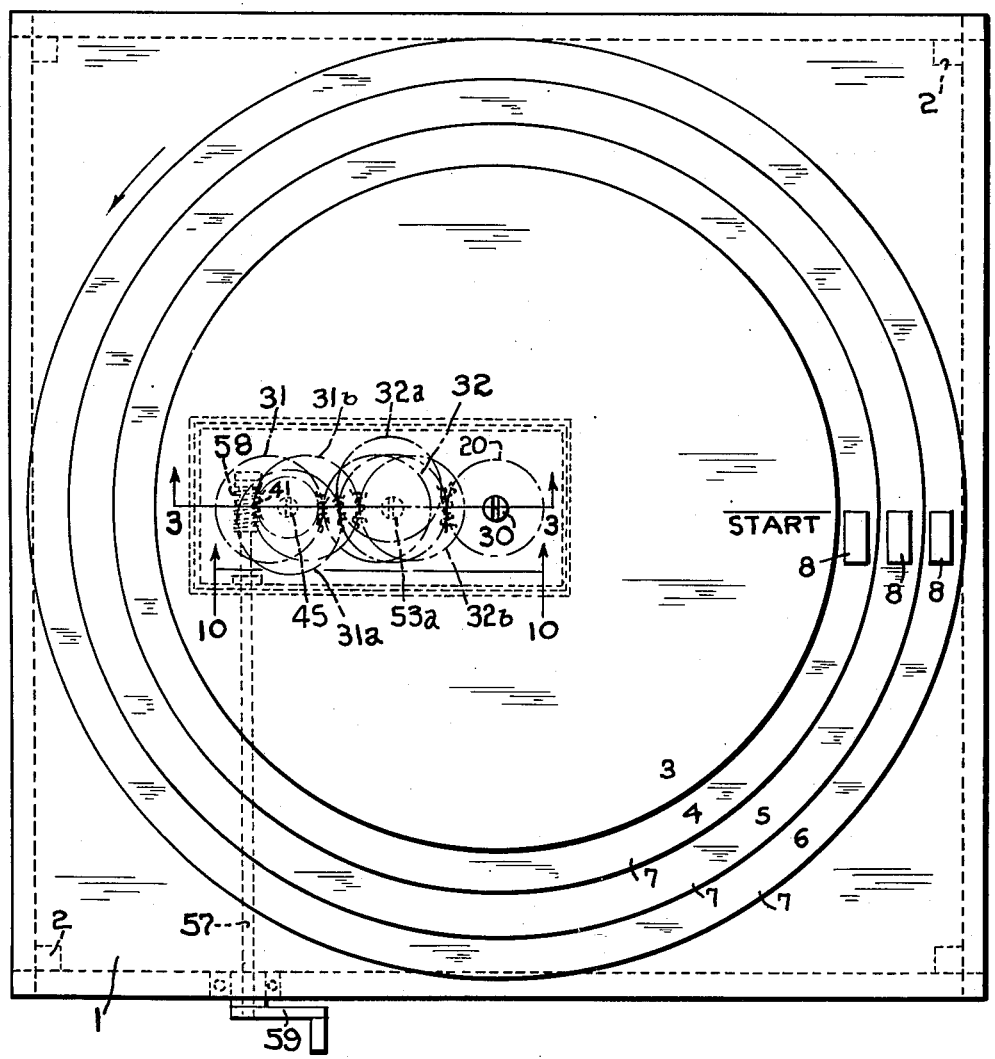
Fig. 1 is a top plan of my game device as mounted in the top of a table.
Figure 2:
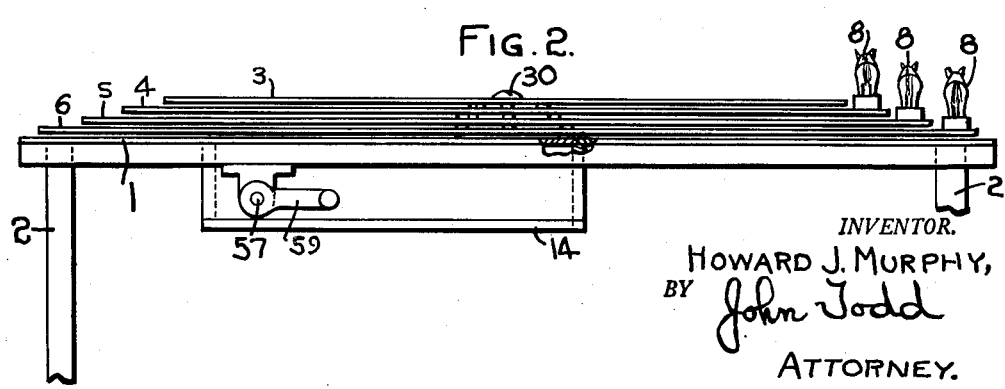
Fig. 2 is a side elevation of the device shown in Fig. 1.
Figure 7:
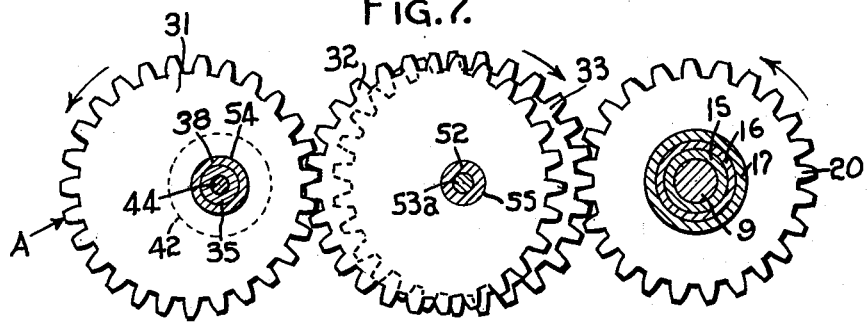
Figure 8:
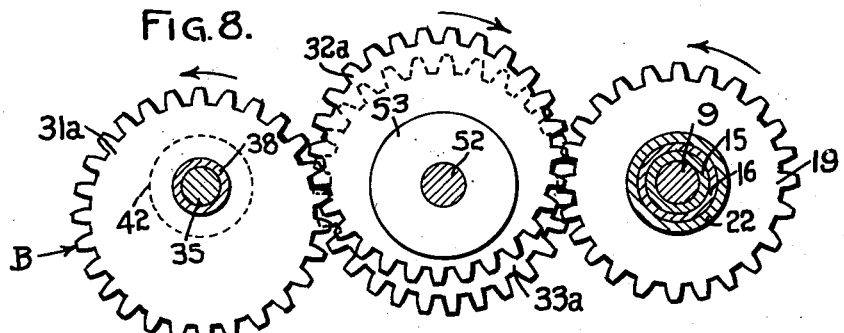
Figure 9:
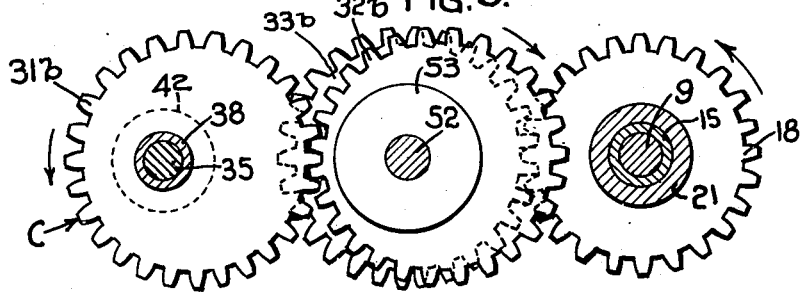
Figure 10:
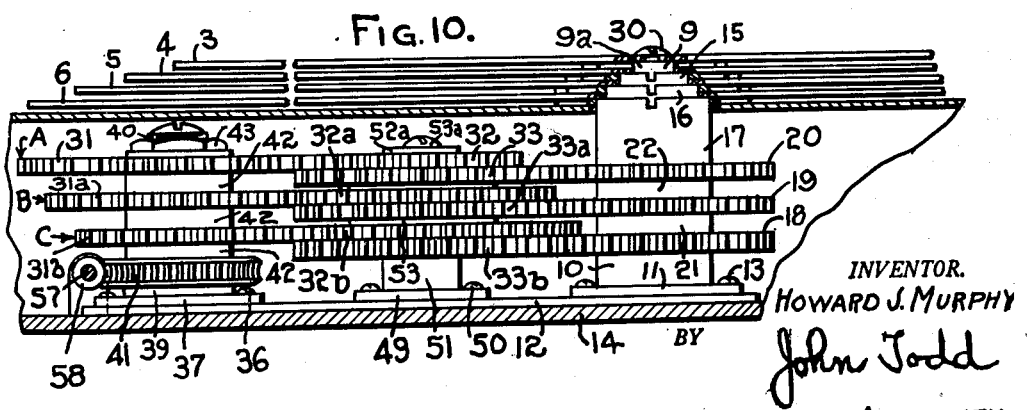

Figs. 7, 8 and 9 are views of the three gear trains which form part of the present invention showing the timing relation of the gears of each train to the gears of the other trains; and Fig. 10 is an enlarged side elevation taken on the line 10—10 of Fig. 1; and Fig. 11 is a section taken on the line 11—11 of Fig. 3.

Referring specifically to the drawing, the game device is mounted on any suitable table which may be a card table having a top 1 and corner legs 2. Four discs are disposed on the top 1 of the table. The upper disc 3 serves to hold the other discs in assembly and does not rotate. The three lower discs 4, 5 and 6 are constructed to rotate freely of the cover disc 3, the table top 1 and each other. The disc 5 has a smaller diameter than the disc 6 and the disc 4 has a smaller diameter than the disc 5 so that each disc provides an annular marginal portion 7. An article 8 simulating a racing object is disposed on each of the marginal portions 7 so as to turn with the respective marginal portion during playing of the game. As a result of the fact that the discs rotate at varying speeds the articles 8 will pass and repass each other to bring about a realistic and entertaining simulation of a race.

In the preferred arrangement for mounting the discs there is provided a shaft which includes a post 9 and a base 10. The base has a flange 11 secured to a plate 12 by the screws 13. The plate 12 may be bolted or secured by any other suitable means to the panel 14 provided as a part of the table. Three hollow spindles or bushings 15, 16 and 17 are concentrically assembled with the post 9 to rotate freely relative to the post and each other. Spur gears 18, 19 and 20 are affixed in non-rotatable assembly with the respective spindles 15, 16 and 17 at the lower ends of the spindles as by swaging the lugs 20a from the spindles to engage the material of the respective gears. The lowermost gear 18 is disposed adjacent the base 10 of the shaft. The lower end of the spindle 16 with its attached gear 19 is maintained in spaced relation to the gear 18 by the spacer 21 and the lower end of the spindle 17 with its attached gear 20 is maintained in spaced relation to the gear 19 by the spacer 22.

The spindles 15, 16 and 17 are of different heights in graduated relation so that the innermost spindle 15 projects above the spindle 16 and the latter projects above the spindle 17. The outer free end of each of the spindles has an attaching means preferably comprising four openings or slots 23 (Figs. 5 and 6) preferably spaced 90 degrees apart. Each of the discs 4, 5 and 6 has an attaching member 24 disposed centrally thereof and providing a plate member 25 secured to the undersurface of the respective disc. Each attaching member 24 is maintained in fixed assembly with its respective disc by means of ears 26 (Figs. 5 and 6) integral with the marginal edges of the plate 25 and extending upwardly through the disc to be clenched over on the other side of the disc from the plate member. Each of the plate members has a central opening 27 (Fig. 5) in general alignment with a central opening 28 in the disc to which it is attached. Each plate member provides adjacent its central opening 27 four lugs 29 which are turned downwardly to engage in the openings 23 of the respective spindles thereby to key the disc in non-rotatable assembly with its spindle. It is understood that the diameters of the central openings 27 of the plate members and the aligned central openings 28 of the discs will be large enough to receive the free end of the respective complementary spindles and the lugs 29 of each plate member will be positioned to accord with the location of the openings 23 of its respective spindle.

In assembling the discs with the spindles, each disc is moved toward the free end of its respective spindle to drop the lugs 29 in the openings 23. When the three discs have been assembled with the spindles they will be disposed in free parallel planes so as to rotate independently of each other. In order to maintain the discs in proper assembled relation with their respective spindles, the cover disc 3 is secured over the upper rotatable disc 4 by any suitable means such as a screw member 30 having its shank in threaded engagement with the post 9, as shown in Fig. 3. The cover disc 3 does not rotate and is supported by the outer end 9a of the post 9 which effects a proper spacing between the discs 3 and 4 to enable the disc 4 to rotate freely relative to the disc 3.

As a means of rotating the spindles 15, 16 and 17, there is provided a series of gear trains A, B and C. The number of gear trains varies with the number of spindles and associated discs and in my present invention three trains are provided, which number conforms with the number of spindles. The gears 18, 19 and 20 are included as elements of the gear trains. Thus, the gear 18 is part of the train C; the gear 19 is part of the train B; and the gear 20 is part of the train A.

The corresponding gears of each train are identical. The train A has a drive gear 31 which is identical in size with the respective drive gear 31a and 31b of the trains B and C. The drive gears 31, 31a and 31b are meshed with driven gears 32, 32a and 32b respectively. Gears 33, 33a and 33b are secured in face to face, adjacent relation to the gears 32, 32a and 32b by any suitable means such as by rivets 34 as shown in Fig. 3. The gears 33, 33a, 33b mesh with the gears 18, 19 and 20 which are fixed to the spindles 15, 16 and 17.

The trains of gears are arranged in superposed relation. In carrying out this mounting method, a post 35 is secured to the base plate 14 by any suitable means such as screws 36 extending through the flange 37 of the post into the plate 12. A hollow spindle 38 is assembled with the post 35 so as to rotate freely with respect to the post. The spindle 38 has a flange 39 at its lower end resting upon the post flange 37 and the upper end of the spindle is preferably externally threaded as at 40. The spindle 38 carries a worm gear 41 fixed to the spindle adjacent the flange 39. The drive gears 31, 31a and 31b are mounted in fixed assembly with the spindle 38 above the worm gear 41 and are maintained in spaced relation by the spacers 42. A nut member 43 in threaded assembly with the external threads 40 of the spindle 38 holds the gears against axial displacement with respect to the spindle 38, and the spindle in turn is maintained against axial movement relative to the post 35 by means such as the screw 44 having a head 45 overlying the outer free end 46 of the spindle 38 and a shank 47 in threaded engagement with the post 35 (Fig. 3).

The gears 32, 32a and 32b which carry the respective gears 33, 33a and 33b are mounted to rotate freely about a post 48. The post 48 has a flange 49 secured adjacent the base plate 12 by screws 50. The post has a base 51 extending from the flange 49 and a narrow stem 52 extending from the base. The pairs of gears 32 and 33, 32a and 33a, and 32b and 33b have spacers 53 disposed therebetween so that the pairs may rotate freely relative to each other. The last mentioned pairs of gears are maintained against axial movement relative to the stem 52 by the washer element 52a secured to the end of the stem 52 by the screw 53a which is threaded into the stem.

The aforementioned varying speeds of the spindles 15, 16 and 17 are effected by the off-center or eccentric relationship provided in the gears of each of the trains A, B and C. Thus, with reference to Figs. 4 and 7 of the drawing, it will be seen that in the gear train A the drive gear 31 is mounted upon the spindle 38 in off-center relation. The cooperating driven gear 32 is mounted in off-center relation to the stem 52 and by reason of the fact that the spindle-receiving hole 54 of the gear 41 is off-center the same distance as the stem-receiving hole 55 of the gear 32, the gears 31 and 32 are meshed so that the shortest distance from the center of the hole in one gear falls in line with the longest distance from the center of the hole of the other gear. The stem-receiving hole 56 of the gear 33 is aligned with the hole 55 of its gear 32, but the hole 56 is in the center of the gear with the result that the gear will run true, but at varying speeds. The gear 33 is meshed with the gear 20, the latter gear being preferably of smaller diameter for a purpose to be hereinafter described. In operation of the gear train, the drive gear 31 turning in a counterclockwise direction will turn the gear 32 in a clockwise direction. As a result of the off-center arrangement of the two gears, the gear 32 will be driven at constantly varying speeds which force is transmitted to the gear 20 by the gear 33 with the result that the gear 20 rotates at varying speeds in a counterclockwise direction.

The gears of the trains B and C are arranged to operate identically to the gears of train A. In order, however, that the speed of each of the spindles 15, 16 and 17 shall vary with relation to each other at any given moment during operation of the game, it is necessary that the gears of pairs 31 and 32, 31a and 32a and 31b and 32b of the respective trains be engaged in predetermined relation to cause the gears 32, 32a and 32b to rotate at speeds which at any given moment vary with relation to each other. This is accomplished by varying the angles of the lines of shortest diameter of each of the drive gears 31, 31a and 31b. Thus, having reference to Fig. 7, it will be seen that the shortest line from the axis to the pitch line of the gear 31a is disposed at a 90 degree angle with relation to the shortest line from the axis to the pitch line of the gear 31. Similarly, the shortest line from the axis to the pitch line of the gear 31b is disposed at a 90 degree angle with relation to the same short line of the gear 31a. As a result of this relationship the gears 32, 32a and 32b will be rotating at a different speed at any moment in the game operation, thereby effecting the passing and repassing of the racing objects in accordance with the objective of simulating a race. While the off-center relationship of the gear pairs 31 and 32, 31a and 32a and 31b and 32b has been described, it will be understood that the same result could be accomplished by using other forms of eccentric gears such as elliptical gears. The off-center type of gear which has been disclosed is preferred, however, as it permits all of the gears except the smaller gears 18, 19 and 20 to be stamped out by the same tools.

The mechanical arrangement whereby force is applied to the spindle 38 so as to rotate the drive gears 31, 31a and 31b consists, in my preferred form, of a shaft 57 having a worm 58 adjacent one end in mesh with the worm gear 41. The shaft 57 is rotated to turn the worm 58 by any suitable mechanical or electrical means. In the present disclosure, as shown in Fig. 4, the shaft is rotated by the hand crank 59.

In operation of the game device an object 8, which may be a miniature horse, is placed on each of the discs 4, 5 and 6 so as to line up evenly with a radial line which may be marked "start" as shown in Fig. 1. The mechanism is put into motion by turning the handle 59 which rotates the shaft 57 and the worm 58. As a result of interengagement of the worm 58 with the worm gear 41, rotational force is transmitted to the spindle 38 which causes the drive gears 31, 31a and 31b to rotate. The constant rotational force transmitted simultaneously to the drive gears is carried by the gear trains to the bushings 15, 16 and 17 which are keyed to the discs 4, 5 and 6 by the preferred method hereinabove described. As a result of the mechanical relationship between the bushings and their respective gear trains, the constantly varying speeds effected by the gear arrangement of the trains is transmitted to the discs 4, 5 and 6 thereby causing the objects 8 carried by the discs to move around the track at relative varying speeds in simulation of an actual race.

It is desirable, in order that the race may present a realistic effect, for one of the discs to rotate at least one complete revolution during the course of a race. Thus, the line marking the finish of the race may be the same as the starting line and the disc which first makes a complete revolution will, of course, carry its object across the line first. It will be understood that since one revolution of a spindle 15, 16 and 17 rotates its respective disc one revolution, the gear ratios between the gears 33, 33a and 33b and their respective cooperating gears 20, 19 and 18 must be such that the latter gears complete a revolution before a revolution is completed by the former. If such a gear ratio is not provided and if the gears 33, 33a and 33b and their respective cooperating gears 20, 19 and 18 are of equal diameter, all the discs with the objects 8 will complete a revolution at the same time so as to result in a tie even though they vary in speed in relation to each other during the revolution. In order that this tie effect cannot take place during the time in the course of a game it takes the fastest track to make one complete turn, the gears 20, 19 and 18 are of smaller diameter than the gears with which they mesh. How much smaller the diameter is depends on how far beyond a single revolution it is desired that the discs rotate before they effect an even line.

It will be understood that an object of the game is to arouse interest and suspense in the players as they attempt to determine during playing of the game which object will cross the finish line first. Due to the varying speed arrangement of the gears it will be difficult, if not impossible, for the players to determine until near the end of the game at best, which object will win. By rotating the discs until all objects have crossed the finish line each of the discs will have rotated at least one complete revolution. The relative distances between the horses beyond the finish line will vary with each race.

When the horses are manually moved to even relationship at the starting line following the end of a race and prior to the commencement of the next succeeding race, the relationship of the objects to the positions of the gears of each train is automatically altered so that the outcome of the next race cannot be predicted.

While I have illustrated the game device as having three rotating discs, it will be understood that any reasonable number may be provided by simply adding the necessary mechanical means as shown and described in connection with the three discs of the preferred arrangement.

Although I have illustrated and described a preferred embodiment of my invention, I do not wish to be limited thereby because the scope of my invention is best defined by the following claims.

I claim:

1. An amusement device of the class described including a plurality of trains of gear members, an object in mechanical assembly with each of said trains so as to be rotated thereby, each of said gear trains including a drive gear and a second gear having intermeshing gear elements, said gears being of different radii at points of intermesh to rotate said second gear at constantly varying speeds a third gear assembled with said second gear to rotate therewith, and a fourth gear of smaller diameter than said third gear in intermeshing engagement therewith, said third gear being constructed and arranged with relation to said second gear to transmit said varying speed of said second gear to said fourth gear, said fourth gear having means for rotating said object, and means for driving said drive gear.

2. An amusement device of the class described including a plurality of trains of gear members, an object in mechanical assembly with each of said trains so as to be rotated thereby, each of said trains including a drive gear mounted in off-center relation to a drive shaft, a second gear mounted in off-center relation to a post and being meshed with said drive gear whereby said drive gear rotates said second gear at constantly varying speeds, a third gear engaged with said second gear so as to rotate therewith, and a fourth gear in meshing engagement with said third gear, said fourth gear being of smaller diameter than said third gear, said third gear being constructed and arranged with relation to said second and fourth gears to transmit said varying speed of said second gear to said fourth gear, and said objects to be rotated being mechanically associated with said respective fourth gears whereby said varying speeds of said fourth gears are transmitted thereto.

HOWARD J. MURPHY.

References Cited in the file of this patent

UNITED STATES PATENTS

| Number | Name | Date |
|---|---|---|
| 461,363 | Murdock | Oct. 13, 1891 |
| 785,149 | Brooks | Mar. 21, 1905 |
| 1,526,419 | Grubbs | Feb. 17, 1925 |
| 1,630,229 | Thuss | May 24, 1927 |
| 1,995,137 | Woolard | Mar. 19, 1935 |
| 2,121,223 | Fuhrmann et al. | June 21, 1938 |

FOREIGN PATENTS

| Number | Country | Date |
|---|---|---|
| 18,774 | Great Britain | 1889 |
| 262,160 | Great Britain | Dec. 1, 1926 |